United States Patent [19] [11] 4,346,409

Ishida et al. [45] Aug. 24, 1982

[54] METHOD OF AND APPARATUS FOR PROCESSING A RADIOGRAPHIC IMAGE

[75] Inventors: Masamitsu Ishida; Hisatoyo Kato; Seiji Matsumoto, all of Minami-ashigara, Japan

[73] Assignee: Fuji Photo Film Co., Ltd., Kanagawa, Japan

[21] Appl. No.: 220,771

[22] Filed: Dec. 29, 1980

[30] Foreign Application Priority Data

Dec. 25, 1979 [JP] Japan .................... 54/168936

[51] Int. Cl.$^3$ .................... H04N 1/40
[52] U.S. Cl. .................... 358/280; 358/96; 358/111; 358/284; 364/414
[58] Field of Search .................... 358/284, 282, 280, 96, 358/166, 111; 250/416 TV; 364/414, 515

[56] References Cited

U.S. PATENT DOCUMENTS 4,306,290  12/1981  Kato .................... 364/414

Primary Examiner—Howard Britton
Attorney, Agent, or Firm—Gerald J. Ferguson, Jr.; Joseph J. Baker

[57] ABSTRACT

A method of and apparatus for processing a radiographic image in a radiographic image recording system in which an image on a radiographic film is scanned and read out by a detector which gives an output to be processed and used for recording a visible image on a recording material. In the processing of the detected output, an operation represented by a formula $$D' = Dorg + F(X)$$

is conducted at every scanning point, where Dorg is the original density detected by the detector, X is Dorg−Dus, Dus is an unsharp mask density corresponding to a super-low spatial frequency, and F(X) is a monotone increasing function which satisfies the condition of $F'(X_1) \geq F'(X_2) \geq 0$ for arbitrary values $X_1$, $X_2$ of X ($|X_1| < |X_2|$) and in which there exists at least one certain value $X_0$ of X which satisfies the condition of $F'(X_1) > F'(X_2)$ when $|X_1| < |X_0| < |X_2|$.

10 Claims, 8 Drawing Figures

METHOD OF AND APPARATUS FOR PROCESSING A RADIOGRAPHIC IMAGE

BACKGROUND OF THE INVENTION

1. Field of the Invention

This invention relates to a method of processing a radiographic image used for medical diagnosis and an apparatus therefor, and more particularly to a method of and apparatus for processing a radiographic image when the radiographic image once recorded on a radiographic film is copied on a recording medium.

The radiographic image referred to in this application means an original X-ray image recorded on an X-ray film by the conventional radiographic method. The present invention is applied to the radiographic image copying system in which the radiographic image is once converted to an electric signal and the electric signal is used for reproducing the radiographic image on a final recording medium like an ordinary photographic film. When the electric signal is used for reproducing the radiographic image, the electric signal is processed to obtain an improved image having high diagnostic efficiency and accuracy.

2. Description of the Prior Art

Since X-rays do harm to the human body, it is impossible from the viewpoint of safety to expose the human body to X-rays of high dose. Therefore, it is desirable that the necessary information in the radiography can be obtained by exposing the human body only once to the X-ray of comparatively low dose. On the other hand, radiographs should preferably have both a wide exposure latitude and high image quality of high contrast, high sharpness, low noise etc. for viewing and diagnosis. Unfortunately, since the conventional radiography is designed to satisfy all the required conditions to some extent, the range of recording density or the ability to record various levels of information and the image quality are both insufficient and neither of these properties are completely satisfied.

In view of the above defects in the conventional radiography, the inventors of the present invention have proposed a radiographic image processing method in which the radiographic image is read out by an electronic image read-out device to convert the radiographic image into an electric signal and the electric signal is processed to enhance the diagnostic efficiency and accuracy of the image when the image is reproduced on a recording medium like a photographic film by improving the sharpness and the granularity of the image, as disclosed in Japanese unexamined Patent Publication No. 54(1979)-121043. This method remarkably improve the diagnostic efficiency and accuracy as compared with the conventional radiography.

Further, the inventors of the present invention have found a new process and apparatus which solve the above mentioned problems and satisfy both the wide exposure latitude and the high image quality of high contrast, high sharpness and low noise in the radiographic image copying system as disclosed in a copending application; U.S. patent application Ser. No. 106,734. According to this method and apparatus, a radiographic image having high diagnostic efficiency and accuracy can be economically obtained at a high speed.

The method and apparatus of the above mentioned copending application are characterized in that, in the course of scanning a radiographic film to read out the radiographic image information recorded thereon, converting the read out information into an electric signal and recording a visible image on a recording medium using the electric signal, an unsharp mask density Dus corresponding to the super-low frequency is obtained for each scanning point and a signal conversion represented by a formula $$D' = Dorg + \beta(Dorg - Dus)$$

where Dorg is an original image density read out from the radiographic film and $\beta$ is an emphasis coefficient is performed to emphasize the frequency component above the super-low frequency. In this method and apparatus, the emphasis coefficient $\beta$ may be a fixed value or a variable value. In the latter case, the emphasis coefficient $\beta$ may be varied with either Dorg or Dus.

However, according to the research and investigations conducted further thereafter by the inventors of the present invention, the artifact is liable to appear in the low and high density regions when the emphasis coefficient $\beta$ is fixed. When the emphasis coefficient $\beta$ is made variable, on the other hand, it was found that, in case that $\beta$ was monotone increasing function ($\beta' \geq 0$) for instance, the artifact was prevented from appearing in the low density region where Dorg or Dus was small, but it was difficult to prevent the appearance of the artifact in the form of black lines in the muscle area around the boundary of a muscle and a bone for example. In other words, in the above described method, it was difficult to completely prevent from occurring artifacts such as the low density portions around the boundaries of edges in an image of bones and muscles becoming saturated white to the fog level of the recording medium or the high density portions around the boundaries becoming black lines, or the contour lines appearing around the contour of the barium sulfate contrast medium over-emphasized in a radiographic image of a stomach (Magen). Thus, in the above described method it was difficult to sufficiently improve the diagnostic efficiency and accuracy of the finally obtained radiographic image and there was a fear of making an error in diagnosis in some cases due to the artifacts.

SUMMARY OF THE INVENTION

It is, therefore, the primary object of the present invention to provide a radiographic image processing method and apparatus capable of obtaining a radiographic image high diagnostic efficiency and accuracy free from the artifacts.

A more specific object of the present invention is to provide a radiographic image processing method and apparatus for obtaining a radiographic image free from artifacts in an economical way at a high speed.

The above objects are accomplished by reducing the increase in the degree of frequency emphasis in the region where the difference of $|Dorg - Dus|$ is large by conducting an operation represented by a formula $$D' = Dorg + F(X) \tag{1}$$

where X is $X = Dorg - Dus$ and F(X) is a monotone increasing function which satisfies the condition of $F'(X_1) \geq F'(X_2) \geq 0$ for arbitrary values $X_1$, $X_2$ of X ($|X_1| < |X_2|$) and in which there exists at least one certain value $X_0$ of X which satisfies the condition of $F'(X_1) > F'(X_2)$ when $|X_1| < |X_0| < |X_2|$.

In other words, the method and apparatus in accordance with the present invention are characterized in that, in the course of scanning a radiographic image on a radiographic film to read out the radiographic image information recorded thereon, converting the read out information into an electric signal and recording a visible image on a recording medium using the electric signal, an unsharp mask density Dus corresponding to the super-low frequency is obtained for each scanning point and a signal conversion represented by a formula $$D' = Dorg + F(X)$$

is performed to emphasize the frequency component above the super-low frequency, where X is $X = Dorg - Dus$ and $F(X)$ is a monotone increasing function which satisfies the condition of $F'(X_1) \geq F'(X_2) \geq 0$ for arbitrary values $X_1$, $X_2$ of X ($|X_1| < |X_2|$) and in which there exists at least one certain value $X_0$ of X which satisfies the condition of $F'(X_1) > F'(X_2)$ when $|X_1| < |X_0| < |X_2|$. It should be noted that the value $|X_0|$ is within the range of $|X| = |Dorg - Dus|$.

Said function $F(X)$ will be understood to contain various functions such as a function $F(X)$ satisfying the conditions of $F''(X) > 0$ when $X < 0$ and $F''(X) < 0$ when $X > 0$ and a function in which a part or whole of this nonlinear function is approximated by one or more linear functions.

Further, the function $F(X)$ is not necessary a function of X alone which is $X = Dorg - Dus$, but may also be a function of Dorg or Dus as well. This means mathematically that said formula (1) contains a formula in which $F(X)$ is replaced by $\beta(Dorg) \cdot f(X)$ or $\beta(Dus) \cdot f(X)$. In these cases, it should be noted that said $F'(X)$ or $F''(X)$ means $\partial F(X)/\partial X$ or $\partial^2 F(X)/\partial X^2$, respectively.

As for the monotone increasing function $F(X)$ where X is $X = Dorg - Dus$ in said formula (1), there may be used a nonlinear monotone increasing function such as $$F(X) = a \cdot sgn(X) \cdot |X|^n + b \quad (2)$$

where a and b are constants and $a > 0$, $0 < n < 1$, sgn $X = 1$ (X > 1), sgn $X = -1$ (X < 1), sgn $X = 0$ (X = 0), $$F(X) = a \cdot \sin(pX) \quad (3)$$

where $a > 0$, $|pX| < \pi/2$, or $$\left. \begin{array}{l} F(X) = 1 - e^{-x} \ (X > 0) \\ F(X) = -1 + e^x \ (X < 0) \end{array} \right\} \quad (4)$$

These formulae (2), (3), (4) all satisfy the conditions of $F'(X_1) > F'(X_2) > 0$ when $|X_1| < |X_2|$ and said conditions of $F'(X_1) \geq F'(X_2) \geq 0$. Further, these functions all satisfy the conditions of $F''(X) < 0$ (X > 0) and $F''(X) > 0$ (X < 0) and $F'(X)$ is gradually reduced (gradient is decreasing) as X increases in the region of positive X in a nonlinear form.

However, as mentioned above, the function $F(X)$ may have a part where the secondary differentiation $F''(X)$ is zero, namely a linear part, or may be in such a form that the $F''(X)$ is zero throughout its whole range so long as above conditions are satisfied. One example of such a form wherein the $F''(X)$ is zero throughout its whole range and the condition of $F'(X_1) > F'(X_2)$ is satisfied is a combination of several linear functions connected in series approximating said nonlinear functions (2), (3) and (4).

For instance, a function of a combination of linear functions as follows can be employed.

$$\left. \begin{array}{l} F(X) = aX \ (|X| < |X_1|) \\ F(X) = sgn(X)(b|X| + c) \ (|X_1| \leq |X| < |X_2|) \\ F(X) = sgn(X)(d|X| + e) \ (|X_2| \leq |X|) \end{array} \right\} \quad (5)$$

(wherein $a > b > d > 0$, $c = a|X_1| - b|X_1|$, $e = b|X_2| + c - d|X_2| = a|X_1| + b(|X_2| - |X_1|) - d|X_2|$)

Further, in case that $F(X)$ is substituted by $\beta(Dorg) \cdot f(X)$ or $\beta(Dus) \cdot f(X)$, the following functions can be used for instance as the function $f(X)$.

$$\left. \begin{array}{l} f(X) = aX \ (|X| < |X_1|) \\ f(X) = b\left[1 - \exp\left\{-\frac{a}{b}(X - |X_1|)\right\}\right] + a|X_1| \ (X \geq |X_1|) \\ f(X) = -b\left[1 - \exp\left\{\frac{a}{b}(X + |X_1|)\right\}\right] - a|X_1| \ (X \leq -|X_1|) \end{array} \right\} \quad (6)$$

where $\alpha$ and b are positive constants. The function $f(X)$ is, however, enough to be a function satisfying the conditions required for said function $F(X)$. Therefore, said $F(X)$ as shown in the formulae (2), (3), (4) and (5) can also be used as the function $f(X)$.

Further, it should be noted that although the above mentioned functions $F(X)$ are all in the form of point symmetric with respect to the origin the function $F(X)$ to be employed in this invention is not always limited to such a point symmetric function.

In accordance with the present invention, since the first differentiation $F'(X)$ of the function of the difference between Dorg and Dus is made smaller in the region where $|X|$ is larger and positive in such region, the rate of the increase in the degree of frequency emphasis is reduced as well as the degree of emphasis itself is increased in the range of large $|X|$, whereby the occurrence of the artifact is prevented.

That is to say, in accordance with the present invention, the frequency emphasis by the unsharp masking process is conducted normally in the range where the difference density is small and the rate of increase in the degree of frequency emphasis is reduced in the range where the difference density is large, e.g. at the boundary between a bone and a muscle, the boundary between a soft tissue portion and a gass-filled portion, the boundary between the barium sulfate filled portion and the environment thereof, the blood vessels in the angiography, whereby the occurrence of artifacts is prevented.

Further, it should be noted that when said $F(X)$ is replaced by $\beta(Dorg) \cdot f(X)$ or $\beta(Dus) \cdot f(X)$ in the formula (1), $\beta(Dorg)$ or $\beta(Dus)$ naturally changes as Dorg or Dus changes, and accordingly the results obtained in case that $\beta$ is made variable as disclosed in said U.S.

patent application Ser. No. 106,734 are also obtained in addition to said various results in the present invention.

In other words, it is further possible to prevent the occurrence of artifacts having contours which are liable to occur in the boundaries in the low density region.

The unsharp mask density Dus referred to in this invention means a density representing every scanning point which is made by blurring the original image density to contain only the frequency component lower than the super-low frequency. In other words, the unsharp mask density Dus is a density representing an unsharp image obtained by blurring the original image to such an extent that the unsharp mask density contains only the super-low frequency. In the unsharp mask corresponding to the unsharp image, the modulation transfer function is not less than 0.5 at the spatial frequency of 0.01 cycle/mm and not more than 0.5 at the spatial frequency of 0.5 cycle/mm. Further, in order to enhance the diagnostic efficiency and accuracy remarkably, it is desired to use an unsharp mask in which the modulation transfer function is not less than 0.5 at the spatial frequency of 0.02 cycle/mm and not more than 0.5 at the spatial frequency of 0.15 cycle/mm.

In other words, the unsharp mask to be used in the present invention can be defined as the one in which the spatial frequency fc at which the modulation transfer function becomes 0.5 is within the range of 0.01 to 0.5 cycle/mm, and preferably within the range of 0.02 to 0.15 cycle/mm.

The unsharp mask can be obtained by the following methods for example.

(1) When the image signal is read out, the diameter of the read-out light beam spot is changed to average the density at the measuring point together with the densities around the measuring point. In order to effect this, the diameter of the light beam spot may be directly changed or an optical masking may be made by use of an aperture or the like.

(2) The original image signal at every scanning point is memorized and the memorized original image signals are read out together with the surrounding signals according to the size of the unsharp mask to obtain a mean value as the unsharp mask density Dus. (The mean value is obtained as an simple arithmetical mean or various kinds of weighted mean.) In this method, the unsharp mask is made in the form of analog signals or in the form of digital signals after A/D conversion. Further, it is also possible to make the unsharp mask by transmitting the analog signal through a low pass filter in the primary scanning direction and processing the signal in the digital form in the sub-scanning direction.

Among the above three methods, the second method (2) is the most preferable from the viewpoint of ability of giving flexibility to the image processing.

In order to carry out the second method, the following operation of the arithmetic mean is conducted for every scanning point to obtain the unsharp mask density Dus.

$$Dus = \sum_{i,j \epsilon 0} \alpha_{ij} Dorg(i,j) \quad (7)$$

where i and j are coordinates of the circular area having the scanning point at the center thereof and $\alpha_{ij}$ is a weighting coefficient which should preferably have a smooth variation in all the radial directions isotropically and satisfies the formula $$\sum_{i,j \epsilon 0} \alpha_{ij} = 1.$$

Said circular area includes N number of picture elements in the direction of the diameter thereof.

However, in order to simply carry out the above operation, it is necessary to conduct the $(\pi/4)N^2$ times of multiplications and $(\pi/4)N^2$ times of additions. Therefore, when N is a large number it takes a very long time to conduct the operation, which is impractical. Since it is necessary to scan the original radiograph with a sampling rate of 5 to 20 pixel/mm (50 to 200μ in terms of the size of the picture element) in order to preserve the necessary frequency components of the image, the number of the picture elements (N) included in the unsharp mask corresponding to the super-low frequency is inevitably large and accordingly it takes a very long time to conduct the above operation. For instance, in case of using an unsharp mask having a weighting coefficient having a Gaussian distribution, N becomes about 50 when the size of the picture element is 100μ×100μ and fc=0.1 cycle/mm and about 250 if fc=0.02 cycle/mm. This means that the time for conducting the above operation will be considerably long.

Further, in order to obtain the arithmetic mean for the circular area, the range in which the addition is to be conducted should be changed for every scanning line, which makes the operating mechanism very complex and costly.

Therefore, it is desirable to simplify the operation to reduce the time for conducting the operation to obtain the unsharp mask density. One example of such simplification methods is to obtain the simple arithmetic mean (non-weighted arithmetic mean) over a rectangular area enclosed with two lines parallel to the primary scanning direction and two lines parallel to the sub-scanning direction. In other words, the unsharp mask density Dus is obtained by calculating the simple arithmetic mean of the original image density Dorg within the rectangular area. Another example of such simplifications is to make a blurred density in the primary scanning direction by transmitting the analog signal representing the original image density through a low-pass filter and then obtaining the arithmetic mean of the A/D converted digital signals in the sub-scanning direction. These methods were disclosed in the copending application; U.S. patent application Ser. No. 106,734.

In the former method in which the unsharp mask density Dus is obtained by a simple arithmetic mean within a rectangular area, it has been proved by the present inventors that the results in the diagnostic efficiency and accuracy were as good as those obtained by use of the ideal circular unsharp mask having a Gaussian distribution in its weighting coefficient, although the above method should have defects in that the rate of unsharpness is different in the direction and further the transfer function has an undesirable fluctuation as compared with the mask having a smoothly changing weighting coefficient in the form of Gaussian distribution. Further, this method is much more advantageous in that the operation is very simple and accordingly does not take a long time, which results in high speed and low cost of the image processing apparatus. These advantages are true for both the analog and digital signals.

Since the modulation transfer function of the rectangular unsharp mask having a uniform weighting becomes a sinc function (sinc(x)=sin $\pi x/\pi x$), the aforesaid definition that the spatial frequency fc in which the modulation transfer function becomes 0.5 to 0.01 to 0.5 cycle/mm, preferably 0.02 to 0.15 cycle/mm is equivalent to that the rectangular unsharp mask has a size of 60 mm to 1.2 mm, preferably 30 mm to 4 mm. Further, in case that the shape of the unsharp mask is an elongated rectangle, each side of the rectangle is preferred to have a length within the above range. In case of the image processing of a linear tomography, the unsharp mask is preferred to have an elongated rectangular shape.

In the latter method in which a low-pass filter is used for obtaining a unsharp mask density Dus, it has also been proved by the present inventors that the results in the diagnosis efficiency and accuracy were as good as those obtained by use of the ideal circular unsharp mask having a varying weighting coefficient, although the above method does not have a uniform balanced weighting coefficient. Further, this method is much more advantageous in that the operation is very simple and accordingly does not take a long time by only performing a low-pass filtering of the analog signal in the primary scanning direction thereby making the operation of the digital signals that will take some time unnecessary. This results in high speed and low cost of the image processing apparatus. In addition, if the addition of the digital signals in the sub-scanning direction is made to be a simple arithmetic addition to obtain an arithmetic mean, there is no need to conduct multiplication, which also results in simplification of the apparatus and speed up of the operation. It has also been proved by the present inventors that even with such a very simplified method and resulting diagnostic efficiency and accuracy is not substantially lower than that resulting from the method in which the unsharp mask is obtained through an ideal operation which requires a long time.

In the present invention, it is possible to conduct a smoothing process in addition to the above mentioned unsharp masking process. In general, since there appear noises particularly in the high frequency range, the diagnostic efficiency and accuracy is normally enhanced by conducting a smoothing process. As for the smoothing process, it is desirable to make the modulation transfer function not less than 0.5 at the spatial frequency of 0.5 cycle/mm and not more than 0.5 at the spatial frequency of 5 cycle/mm. The desirable extent of smoothing depends upon the kinds of the radiation image. For instance, in case of the chest tomography in which the pattern having a comparatively low frequency is to be observed, it is desired that the noise be removed as much as possible. To the contrary, in case of the angiography in which the fine patterns including fine blood vessels of high frequency, the too much smoothing will damage the fine patterns and lowers the quality of the image. According to the research by the present inventors, however, the diagnostic efficiency and accuracy are enhanced for almost all the kinds of radiation image when the smoothing process is conducted within said range. Furthermore, it has also been confirmed that the smoothing process is effective not only when it is applied to the density D' after the unsharp masking process but also when it is applied directly to the original image density Dorg.

Further, in this invention, a gradation processing can be conducted in addition to the above unsharp masking process. The gradation processing (such as contrast enhancement using nonlinear or linear signal transformation) is particularly effective for the radiographic image in which the density is gently changed over a wide range such as the image of lung cancer or mamma cancer. The gradation processing applicable to the radiographic image recording system is shown in U.S. patent application Ser. Nos. 106,849, now U.S. Pat. No. 4,306,290, and 123,697 filed by the same applicant. The gradation processing can be conducted before or after the unsharp masking process.

The radiographic image information read out by use of the device of this invention is used to reproduce a radiographic image on a recording medium such as a silver halide photographic film, a diazo film or an electrophotographic recording material. Further, it is possible to reproduce the radiographic image on a cathode ray tube.

Now the present invention will be described in more detail with reference to the accompanying drawing as briefly described below.

DESCRIPTION OF THE PREFERRED EMBODIMENTS

Now several preferred embodiments of the present invention will be described in detail referring to the accompanying drawings.

Figure 1:
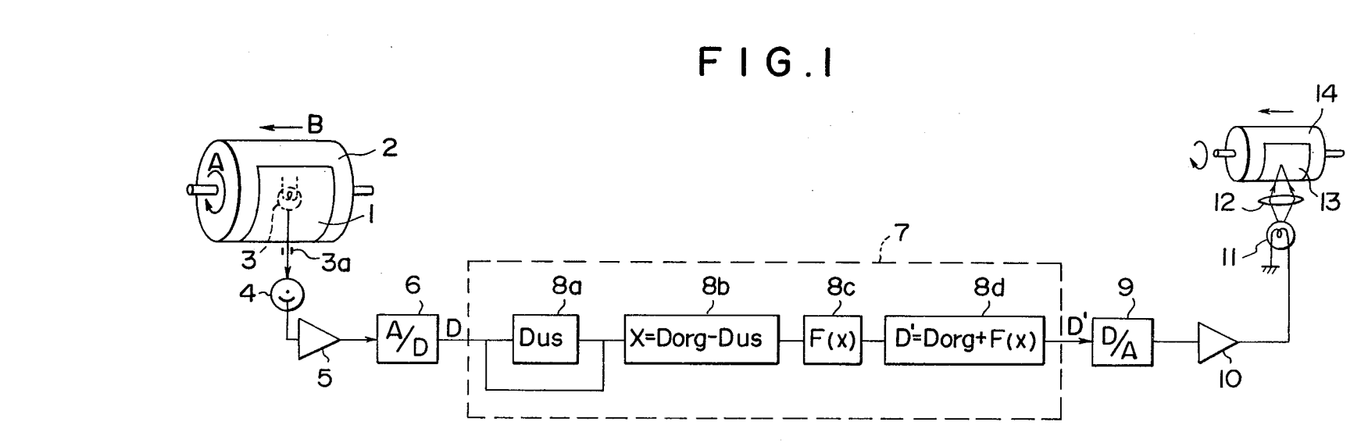
FIG. 1 shows an example of the radiographic image recording system in which the image processing method of the present invention is employed.

FIG. 1 shows an example of the radiographic image copying system in which the image processing method of the present invention is employed. Referring to FIG. 1, the original radiograph 1 is mounted on a transparent drum 2. The transparent drum 2 is rotatable about its axis and movable in the axial direction simultaneously. Within the transparent drum 2 is provided a read-out light source 3 which emits light passing through the drum 2. The light emitted by the light source 3 transmits through the drum 2 and the original radiograph 1 mounted thereon in the form of a thin light beam.

The light beam passing though the original radiograph 1 is received by a photodetector 4 through an aperture 3a. The output of the photodetector 4 is amplified by an amplifier 5 and then converted to a digital signal by an A/D converter 6 and sent to a processing unit 7. In the operating unit 7, the unsharp mask density Dus is obtained from the image signal by an processing element 8a for calculating the unsharp mask density Dus and then the difference Dorg-Dus is obtained by a difference density processing element 8b. Further, the function F(X) is obtained therefrom by a function converter 8c. Finally, an operation represented by the formula (1), $D' = Dorg + F(X)$, is conducted by another processing element 8d. Then, the obtained digital signal D' is converted to an analog signal by a D/A converter 9 and fed into a recording light source 11 through an amplifier 10.

The light emitted by the recording light source 11 is condensed by a lens 12 and focused on a recording medium 13 like a photographic film mounted on a recording drum 14. Since the light source 11 is driven by the power carrying the analog signal representing the radiographic image, a visible radiographic image is recorded on the recording medium 13. By use of this image thus obtained, an examination for diagnosis is carried out.

The above-described image processing may be conducted either by directly using the output of the photodetector 4 as in the above described embodiment in an on-line fashion or by using the data recorded on a magnetic tape or the like in an off-line fashion.

The unsharp masking process is conducted by performing the operation represented by the formula $$D' = Dorg + F(X)$$

where F(X) is defined as mentioned hereinbefore.

The unsharp mask density Dus obtained by the method as mentioned hereinafter should have a modulation transfer function or not less than 0.5 at the spatial frequency of 0.01 cycle/mm and not more than 0.5 at the spatial frequency of 0.5 cycle/mm, preferably not less than 0.5 at the spatial frequency of 0.02 cycle/mm and not more than 0.5 at the spatial frequency of 0.15 cycle/mm. Further, in order to conduct the operation of the above formula, the function F(X) must be determined. This function may be determined for every image case by case by an external operation, or may be selected and determined among preselected several functions memorized in the memory in accordance with the recorded part of the human body or the recorded kind of the disease.

Now the description will be made of several examples of the image processing method in which the function F(X) is concretely determined.

The function F(X) may be selected among preselected various kinds of functions as mentioned above. However, it is also possible to determine the value of F(X) for every value of X by referring to a table in a table-looking method. In other words, a conversion table for X and F(X) is made on a disc or a memory in advance and the value of F(X) corresponding to the designated value of X can be outputed according to the inputed value of X by use of this table.

In the following description of the embodiments, there will be made description of an embodiment using a fixed function of $$F(X) = \alpha \sqrt{|X_1|} \quad (8)$$

and another embodiment using a conversion table to be used for obtaining F(X) from designated values of X by a table-looking method.

Figure 2:
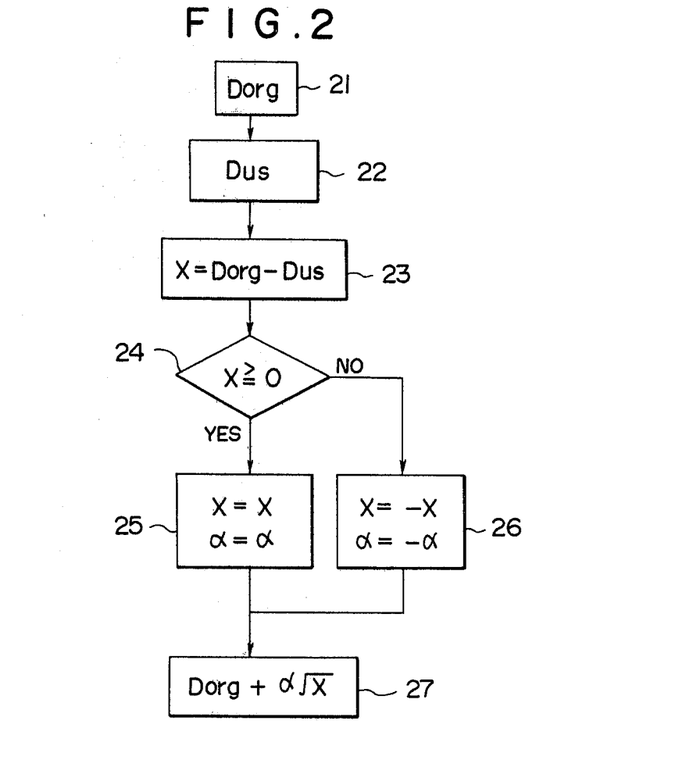
FIG. 2 is a flow chart showing an example of the method of this invention.

FIG. 2 shows a flow chart of the method in which the operation of $F(X) = \alpha \sqrt{|X|}$ is conducted. In this embodiment, an original image density Dorg is obtained (21) at the scanning point on the original radiograph 1. Then, based on the original image density Dorg, an unsharp mask density Dus is obtained by one of the above mentioned methods (22). By use of Dorg and Dus said value X is obtained by the formula $X = Dorg - Dus$ (23). When X is positive or zero, X is made equal to X and α is made equal to α (24,25), and when X is negative X is made equal to −X and α is made equal to −α (24,26) to operate the formula Dorg+F(X) namely $Dorg + \alpha \sqrt{X}$ (27) and obtain the density D'.

Figure 3:
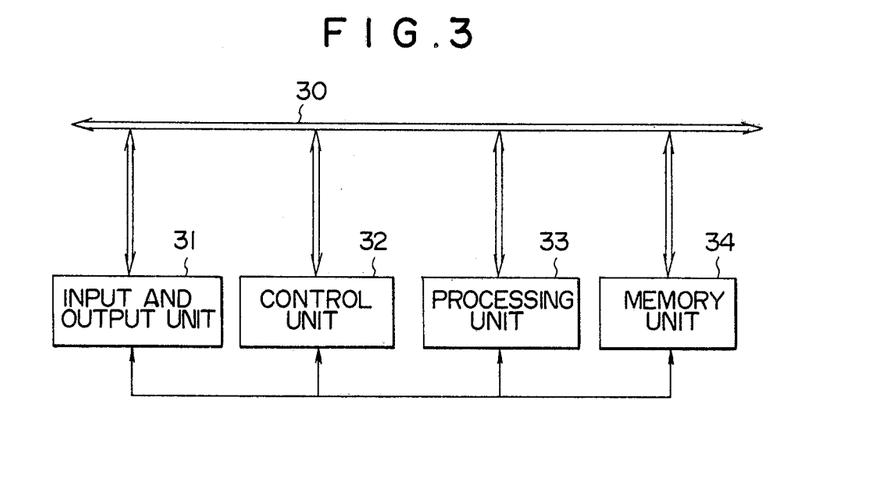
FIG. 3 is a block diagram showing an example of an operating section employed in the apparatus of this invention for carrying out the method of the invention as shown in FIG. 2.

In order to carry out the operation as shown in FIG. 2, an input and output unit 31, a control unit 32, an processing unit 33 and a memory unit 34 are used in connection with a data bus 30 as shown in FIG. 3. The processing unit 33 must have a function to calculate the square root ($\sqrt{\phantom{x}}$) and perform the four operations.

Figure 4:
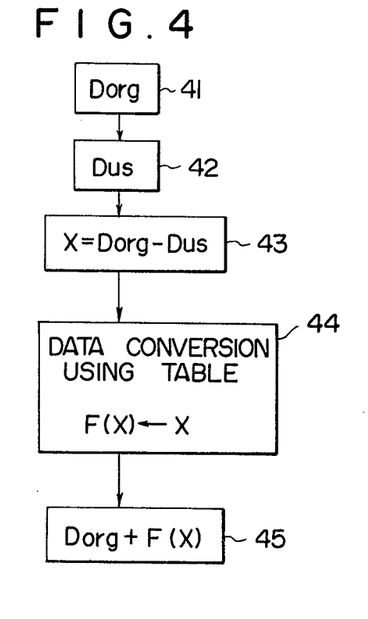
FIG. 4 is a flow chart showing another example of the method of this invention.

FIG. 4 shows a flow chart of the method in which a conversion table is used for conversion of X to F(X), e.g. $F(X) = \alpha \sqrt{X}$. Similarly to the example shown in FIG. 2, Dorg and Dus are first obtained from the scanning points (41,42) and the value X is obtained by the formula $X = Dorg - Dus$ (43). From thus obtained X, values F(X) corresponding to X are obtained referring to the conversion table (44). By use of thus obtained F(X), the operation of the Dorg+F(X) is conducted (45), and the density D' is obtained.

Figure 5:
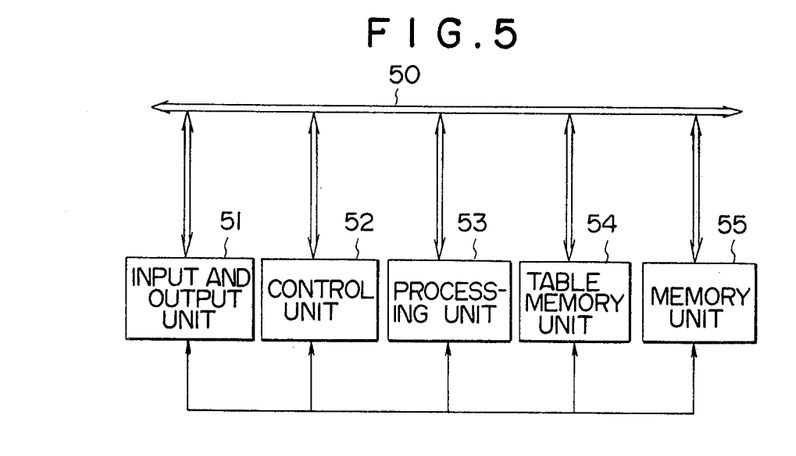
FIG. 5 is a block diagram showing an example of an operating section employed in this invention for carrying out the method as shown in FIG. 4.

In order to carry out the operation as shown in FIG. 4, an input and output unit 51, a control unit 52, an processing unit 53, a table memory unit 54 which is used for conversion of X to F(X) and a memory 55 are used in connection with a data bus 50. The processing unit 53 used here may have capability enough to conduct addition and subtraction since it is unnecessary to make an operation of $F(X) = \alpha \sqrt{X}$.

Further, by conducting a smoothing process for reducing high frequency components in the above obtained density D', it is possible to reduce the noise in the finally recorded radiographic image without damaging the information necessary for diagnosis.

In addition to the above mentioned frequency emphasis by use of the unsharp mask, it is possible to provide a gradation process for changing the gradation of the image. When the gradation process is conducted before the unsharp masking process, the A/D conversion is conducted after the density has been gradation processed with a nonlinear analog circuit. When the gradation process is conducted after the unsharp masking process, the gradation process can be conducted in the digital form or may be conducted in the analog form after D/A conversion. Further, it is possible to conduct the gradation process in the digital form after A/D conversion before the unsharp masking process.

When the image is reproduced finally on the photographic film, a size reduced image can be obtained by recording the image with a higher sampling frequency than the frequency at the time of input scanning. For instance, if the input scanning system has a sampling frequency of 10 pixel/mm and the output scanning system has a sampling frequency of 20 pixel/mm, the finally obtained image has a ½ reduced size with respect to the original image size.

The size reduced image having a reduction rate of ½ to ⅓ is desirable for enhancing further the diagnosis efficiency and accuracy since the frequency component which is necessary for diagnosis becomes close to the frequency at the highest visibility and accordingly the contrast appears to have been raised to the observer.

Further, in the above embodiments, an electric signal amplified nonlinearly by amplifier 5 after detected by the photodetector 4 is often used as the original image density. The reason why such signal is used is that the signal subjected to the band compression and/or nonlinear correction like logarithmic amplification is advantageous to the signal processing. It is, however, of course possible to directly use the output signal of the photodetector as Dorg without any processing. Further, theoretically, the calculation of the unsharp mask density should be based on the energy itself. According to the experiments, however, it has been proved that the mean value obtained based on the log-compressed value corresponding to the density not to the energy showed the same results in the viewpoint of diagnostic efficiency and accuracy. This is practically very convenient and advantageous in conducting the operation. The present invention is not limited to the above embodiments but may be embodied in a various variations.

Now the present invention will be further described with reference to several examples thereof.

EXAMPLE 1

50 samples of typical radiographic images of various portions of a human body were examined both in the form of the original radiographic image and in the form of the radiographic image recorded on a recording medium by way of the radiographic image processing method in accordance with the present invention. In the image processing method according to this invention, as the function F(X) were selected nonlinear functions represented by curves A, B and D in FIG. 6 and a combination of linear functions represented by a combined straight lines C in FIG. 6. Specifically, the diagnostic efficiency and accuracy were compared between these two types of images.

Figure 6:
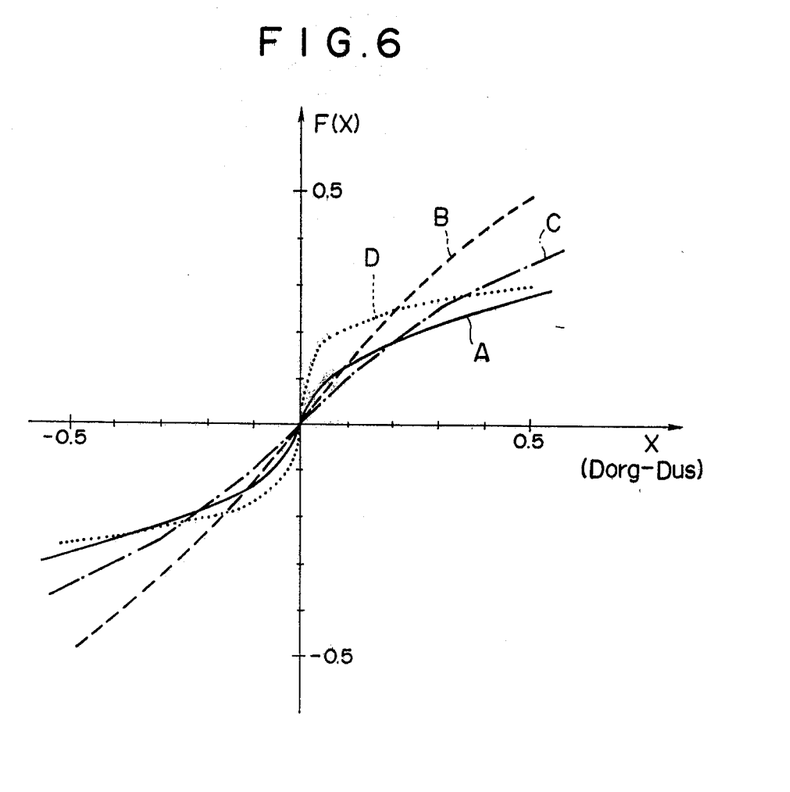
FIG. 6 is a graphical representation showing various examples of the function F(X) of the formula $D' = Dorg + F(X)$ employed in the method of this invention.

The solid line A in FIG. 6 represents a curve of $F(X)=0.4\cdot \text{sgn}(X)|X|^{\frac{1}{2}}$, namely said function (2) in which substitutions are made of $\alpha=0.4$, $n=\frac{1}{2}$ and $b=0$. This is a continuous nonlinear function in which the gradient F'(X) decreases as |X| increases and F''(X) is negative when X is positive and positive when X is negative.

The broken line B in FIG. 6 represents a curve of $F(X)=1-e^{-1.4x}$ (X>0), $F(X)=-1+e^{1.4x}$ (X<0), namely said function (4) in which the coefficient of X is made 1.4. This is also a continuous nonlinear function in which the gradient F'(X) decreases as |X| increases and F''(X) is negative when X is positive and positive when X is negative.

The chain line C in FIG. 6 represents a combination of linear functions represented by a formula $F(X)=\text{sgn}(X)(n|X|+\text{const})$ wherein n is decreased as |X| increases, namely said function (5) in which substitutions are made of a=1, b=0.75, c=0.025, d=0.5, $|X_1|=0.1$ and $|X_2|=0.3$. That is, this function is a combination of the following linear functions.

| | |
|---|---|
| $F(X) = X$ | $X < 0.1$ |
| $F(X) = \text{sgn}(X) (0.75|X| + 0.025)$ | $0.1 \leq |X| < 0.3$ |
| $F(X) = \text{sgn}(X) (0.5|X| + 0.1)$ | $0.3 \leq |X|$ |

In this function, the gradient F'(X) stepwisely decreases as |X| increases, and F''(X) is zero.

The dot line D in FIG. 6 represents a function obtained by use of a conversion table in which the outline is convex upwards in the region of X>0 and convex downwards in the region of X>0. Further, the example shown in FIG. 6 is not symmetric with respect to the origin. This function is employed by use of the table-looking method.

The results of the tests conducted by use of these functions were evaluated by four radiologists since it was impossible to evaluate the diagnostic efficiency and accuracy by the objective physical evaluation by use of sharpness, contrast and granularity.

The results of the evaluation were as shown in the following TABLE 1.

TABLE 1

Head: The skull was not saturated in white. No artifact in the form of black lines was observed in the muscle of the face. The image was clear and had high diagnostic efficiency and accuracy for tumor.

Bones and muscles: No artifact was observed in the bones or the muscles. Accurate diagnosis was possible for both the bones and the muscles.

Angiography: No artifact was observed around the blood vessels. Accurate diagnosis was possible for both the thin and thick portions of the blood vessels.

Double contrast of stomach: No artifact was observed in either the peripheral portion of the stomach or the portion filled with the contrast media. Accurate diagnosis was possible in the whole image of the stomach.

Abdomen: The gas-filled portion of the intestine was not over-emphasized. The diagnostic efficiency and accuracy were improved for the whole abdomen.

Although there was a little observed slight difference in the degree of improvement in the diagnostic efficiency and accuracy between the results obtained by use of the curves, A, B and D, and the combination of straight lines C in FIG. 6, there was not recognized a substantial difference between those results using different curves or lines in any portion of the human body.

EXAMPLE 2

Figure 7:
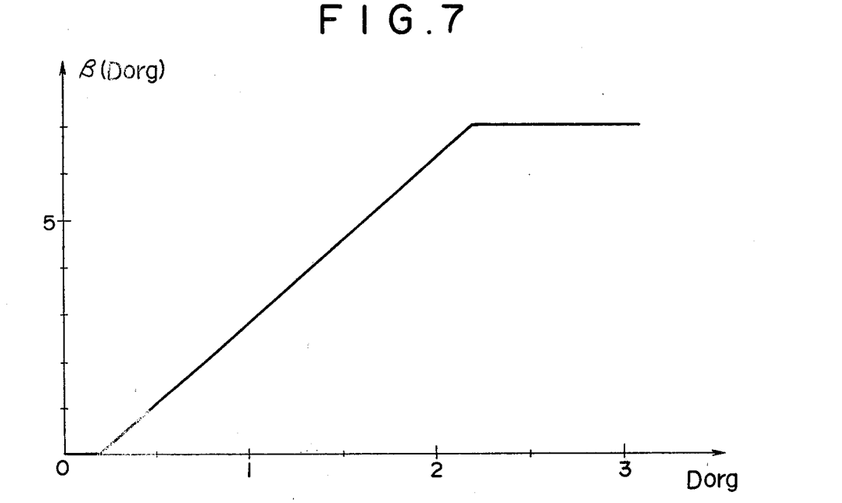
FIG. 7 is a graphical representation showing an example of the function $\beta(Dorg)$ of the formula $D' = Dorg + \beta(Dorg) \cdot f(X)$ used in the present invention.
Figure 8:
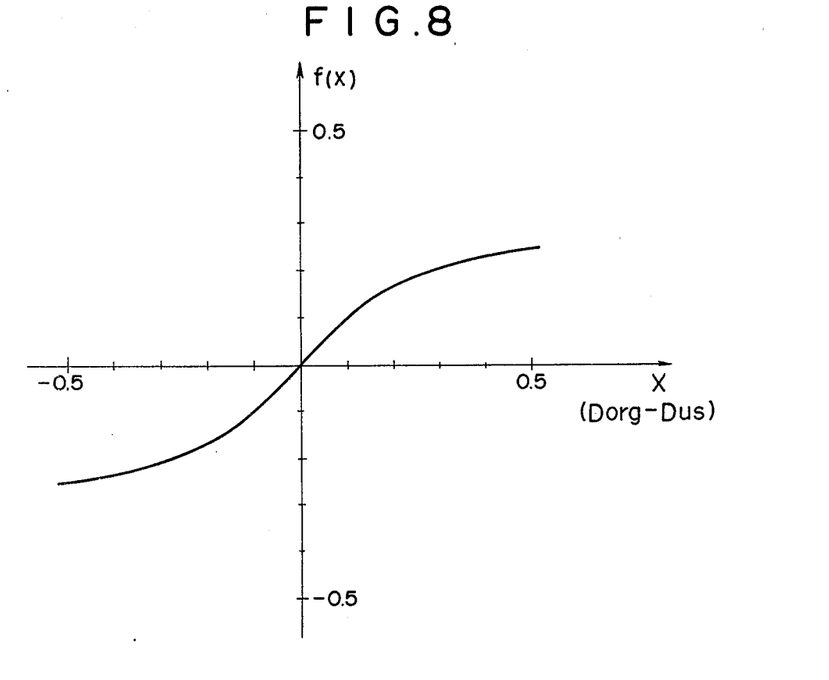
FIG. 8 is a graphical representation showing an example of the function f(X) of the formula $D' = Dorg + \beta(Dorg) \cdot f(X)$ used in the present invention.

As to the various portions of the human body as shown in TABLE 2 below, as many as 30 examples were examined by use of a composite function $F(X,Dorg)$ of $\beta(Dorg)$ as shown in FIG. 7 and f(X) as shown in FIG. 8 in the same method as described in EXAMPLE 1. The function $\beta(Dorg)$ shown in FIG. 7 is a function as represented by the following formulae.

| | |
|---|---|
| $\beta(Dorg) = 0$ | $0 \leq Dorg < 0.2$ |
| $\beta(Dorg) = 3.5 Dorg - 0.7$ | $0.2 \leq Dorg < 2.2$ |
| $\beta(Dorg) = 7.0$ | $Dorg \geq 2.2$ |

This function means that the higher is the level of the original density, the higher becomes the degree of frequency emphasis. The function f(X) shown in FIG. 8 is a function as represented by the following formulae.

$$f(X) = X \qquad (|X| < 0.1)$$

$$f(X) = 0.16 \left[ 1 - \exp\left( -\frac{1}{0.16}(X - 0.1) \right) \right] + 0.1 \qquad (X \geq 0.1)$$

$$f(X) = -0.16\left[1 - \exp\left\{\frac{1}{0.16}(X + 0.1)\right\}\right] - 0.1 \quad (X \leq 0.1)$$

This function f(X) corresponds to said formula (6) in which substitutions are made of $a=0.1$, $b=0.16$ and $X_1=0.1$. This is a function made of a combination of a straight line and curves smoothly combined into a continuous increasing function. The gradient f'(X) of this function f(X) is a constant in a range of $|X|<0.1$ and continuously decreases in a range of $|X|\geq 0.1$ as $|X|$ increases. Further, f''(X) is zero in the range of $|X|<0.1$ and negative when X is positive and positive when X is negative in the range of $|X|\geq 0.1$.

In the above examination also, the results of the obtained images were objectively evaluated by four radiologists similarly to EXAMPLE 1.

The results of the evaluation were as shown in the following TABLE 2.

TABLE 2

Head: Soft tissues were made further easy to observe as compared with EXAMPLE 1 and artifacts around the skull and the face muscle were not observed. Accordingly, even fine tumor could be accurately and easily diagnosed.

Bones and muscles: Both the bones and muscles were made clear and easy to observe free from artifacts. Even around the boundaries therebetween, there was not observed any artiface and accurate diagnosis was possible.

Double contrast of stomach: The image of the stomach was made further clear as compared with EXAMPLE 1 and the diagnostic efficiency and accuracy thereof were improved. Besides, no artifacts were observed in the peripheral portion and the portion filled with the contrast media. Accurate examination for diagnosis was therefore easily conducted.

Furthermore, the results were not substantially changed when the f(X) curve as shown in FIG. 8 was replaced by the curves A, B, D or a combination of line C as shown in FIG. 6.

As clearly shown in TABLE 2, the occurrence of the artifacts was effectively prevented and the diagnostic efficiency and accuracy were fairly improved inspite of the improvement in the image quality of the fine structure of the various portions of the human body of the samples.

It will be understood in FIGS. 6, 7 and 8 that the original image density Dorg, the unsharp mask density Dus and the difference density X therebetween all mean the densities which are obtained by making log conversion and nonlinear correction on the output of the photodetector.

As shown in the above results, in accordance with the present invention, the occurrence of artifacts was effectively prevented and the diagnostic efficiency and accuracy were improved in various examples of the images of a number of kinds of portions of the human body.

We claim:

1. A method of processing a radiographic image in a radiographic image copying system in which an original radiograph is scanned and the radiographic image information recorded on the original radiograph is read out and converted into an electric signal and then an image is reproduced on a recording material by use of the electric signal, said method comprising a step of conducting an operation represented by a formula $$D' = Dorg + F(X)$$

is conducted at every scanning point, where Dorg in the original image density read out from the original radiograph, X is Dorg-Dus, Dus being an unsharp mask density corresponding to a super-low spatial frequency, and F(X) is a monotone increasing function which satisfies the condition of $F'(X_1) \geq F'(X_2) \geq 0$ for arbitrary values $X_1$, $X_2$ of X ($|X_1|<|X_2|$) and in which there exists at least one certain value $X_0$ of X which satisfies the condition of $F'(X_1) > F'(X_2)$ when $|X_1|<|X_0|<|X_2|$, whereby the frequency component above said super-low spatial frequency is emphasized.

2. A method of processing a radiographic image in a radiographic image copying system as defined in claim 1 wherein said unsharp mask density corresponds to the modulation transfer function which is not less than 0.5 at the spatial frequency of 0.01 cycle/mm and not more than 0.5 at the spatial frequency of 0.5 cycle/mm.

3. A method of processing a radiographic image in a radiographic image copying system as defined in claim 1 wherein said unsharp mask density corresponds to the modulation transfer function which is not less than 0.5 at the spatial frequency of 0.02 cycle/mm and not more than 0.5 at the spatial frequency of 0.15 cycle/mm.

4. A method of processing a radiographic image in a radiographic image copying system as defined in any one of claims 1 to 3 wherein said monotone increasing function F(X) is a nonlinear function which satisfies the conditions of $$F''(X) < 0 \quad (X > 0), \text{ and}$$
$$F''(X) > 0 \quad (X < 0).$$

5. A method of processing a radiographic image in a radiographic image copying system as defined in any one of claims 1 to 3 wherein said monotone increasing function F(X) is mainly composed of a nonlinear function which satisfies the conditions of $$F''(X) < 0 \quad (X > 0), \text{ and}$$
$$F''(X) > 0 \quad (X < 0)$$

and partly includes a linear function represented by $F''(X)=0$.

6. A method of processing a radiographic image in a radiographic image copying system as defined in any one of claims 1 to 3 wherein said monotone increasing function F(X) is a combination of a plurality of linear functions which approximate a nonlinear function satisfying the conditions of $$F''(X) < 0 \quad (X > 0), \text{ and}$$
$$F''(X) > 0 \quad (X < 0).$$

7. A method of processing a radiographic image in a radiographic image copying system as defined in claim 4 wherein said monotone increasing function F(X) is a nonlinear function represented by $$F(X) = a \cdot \text{sgn}(X) \cdot |X|^n + b$$

wherein $a$ and $b$ are constants $a>0$, $0<n<1$, and sgn $(X) = 1$     $(X > 0)$,
sgn $(X) = -1$    $(X < 0)$, and
sgn $(X) = 0$     $(X = 0)$.

8. A method of processing a radiographic image in a radiographic image copying system as defined in claim 4 wherein said monotone increasing function F(X) is a nonlinear function represented by $$F(X) = \alpha \cdot \sin(pX)$$

where $|pX| < \pi/2$ and $\alpha > 0$.

9. A method of processing a radiographic image in a radiographic image copying system as defined in claim 4 wherein said monotone increasing function F(X) is a nonlinear function represented by $$F(X) = 1 - e^{-x} \quad (X > 0), \text{ and}$$
$$F(X) = -1 + e^{x} \quad (X < 0).$$

10. An apparatus for processing a radiographic image in a radiographic image copying system comprising a light source for emitting a light beam which scans an original radiograph, a photodetector for detecting the transmitted light from the scanned original radiograph and converting the light to an electric signal, and an processing unit means for processing the electric signal, said processing unit means conducting an operation represented by a formula $$D' = Dorg + F(X)$$

is conducted at every scanning point, where Dorg is the original image density detected by the photodetector, X is Dorg-Dus, Dus being an unsharp mask density corresponding to a super-low spatial frequency, and F(X) is a monotone increasing function which satisfies the condition of $F'(X_1) \geq F'(X_2) \geq 0$ for arbitrary values $X_1$, $X_2$ of X ($|X_1| < |X_2|$) and in which there exists at least one certain value $X_0$ of X which satisfies the condition of $F'(X_1) > F'(X_2)$ when $|X_1| < |X_0| < |X_2|$.

* * * * *